(12) United States Patent
Graham et al.

(10) Patent No.: US 8,332,465 B2
(45) Date of Patent: *Dec. 11, 2012

(54) SYSTEM AND METHOD FOR SUBSCRIPTION MANAGEMENT IN A MESSAGING SYSTEM

(75) Inventors: Stephen Glen Graham, Chapel Hill, NC (US); Peter David Niblett, Whitechurch (GB); Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1207 days.

This patent is subject to a terminal disclaimer.

(21) Appl. No.: 12/127,647

(22) Filed: May 27, 2008

(65) Prior Publication Data

US 2008/0229334 A1 Sep. 18, 2008

Related U.S. Application Data

(63) Continuation of application No. 11/336,248, filed on Jan. 20, 2006, now Pat. No. 7,401,119.

(30) Foreign Application Priority Data

Jan. 20, 2005 (GB) .................................. 0501153.1

(51) Int. Cl.
*G06F 15/16* (2006.01)
*G06F 12/00* (2006.01)

(52) U.S. Cl. ....................................... 709/203; 709/238
(58) Field of Classification Search ................. 709/203, 709/206–207, 227, 229, 238
See application file for complete search history.

(56) References Cited

U.S. PATENT DOCUMENTS

| | | |
|---|---|---|
| 5,329,619 A | 7/1994 | Page et al. |
| 6,748,455 B1 | 6/2004 | Hinson et al. |
| 7,216,181 B1 | 5/2007 | Jannu et al. |
| 7,249,190 B2 | 7/2007 | Franklin et al. |
| 7,401,119 B2 * | 7/2008 | Graham et al. ............... 709/203 |
| 2004/0250060 A1 | 12/2004 | Diep et al. |
| 2005/0251811 A1 | 11/2005 | Ginis et al. |
| 2006/0085507 A1 | 4/2006 | Zhao et al. |
| 2006/0136256 A1 | 6/2006 | Roots et al. |

OTHER PUBLICATIONS

Graham et al. "Publish-Subscribe Notification for Web Services" Mar. 5, 2004, pp. 1-19.

* cited by examiner

*Primary Examiner* — Zarni Maung
(74) *Attorney, Agent, or Firm* — Law Office of Jim Boice

(57) ABSTRACT

A method and system for message subscription management is presented. In one embodiment, the method includes sending a subscription request from a subscriber to a publisher. The subscription request is intercepted and redirected to a broker. Upon intercepting the subscription request, additional information, which includes an instruction to send event messages to the subscriber, is added to the subscription request and forwarded to the broker.

12 Claims, 5 Drawing Sheets

SYSTEM AND METHOD FOR SUBSCRIPTION MANAGEMENT IN A MESSAGING SYSTEM

The present application is a continuation of U.S. patent application Ser. No. 11/336,248 filed on Jan. 20, 2006, and entitled "System and Method for Subscription Management in a Messaging System," which is herein incorporated by reference in its entirety.

BACKGROUND OF THE INVENTION

This invention relates to subscription management in messaging systems.

Publish/Subscribe (or Event Notification) is a well-known messaging pattern where clients interested in information available from a source "subscribe" to the source. When information is available the source then "publishes" the information to the client (which is commonly and hereafter referred to as the "sink").

There are two common variants of this pattern:

a) The "direct" case, where the sink is registered directly with the source. In this pattern the subscriber identifies each source it is interested in, and then registers a separate subscription with each. It only receives messages from sources with which it has registered.

b) The "brokered" case, where the sink is registered with an intermediary "broker", not with the true source. The true source publishes information to the broker, which then forwards the information to the sink.

In the brokered case (b) the subscriber does not have to be aware of the identity or location of the true source (publisher), since it never interacts with it directly. The brokered case also has the characteristic that a sink registered against the broker will receive messages from any source (publisher) which is sending relevant messages to the broker. In some situations, this may be exactly what is wanted. However, in some applications (e.g., systems management) the sink might only be interested in messages from a particular set of sources. For example, the sink might be a monitoring application that only wants to monitor 3 out of a set of 60 similar resources.

The direct case (a) allows the sink to control exactly which source(s) it gets messages from. However it can result in a lot of logical connections (if there are m sources and n sinks, we have a total of n*m connections), and it requires each source to maintain a list of subscriptions and each source to distribute messages to multiple recipients.

A need therefore exists for a system and method for subscription management in a messaging system wherein the above mentioned disadvantage(s) may be alleviated.

SUMMARY OF THE INVENTION

Briefly, the invention includes a computer implementable method for message subscription management that includes sending a subscription request from a subscriber to a publisher. The subscription request is intercepted and redirected to a broker. Upon intercepting the subscription request, additional information, which includes an instruction to send event messages to the subscriber, is added to the subscription request and forwarded to the broker.

BRIEF DESCRIPTION OF THE DRAWINGS

Three systems and methods for subscription management in a messaging system incorporating the present invention will now be described, by way of example only, with reference to the accompanying drawing(s), in which.

DETAILED DESCRIPTION OF THE PREFERRED EMBODIMENT

It will be appreciated that it is common practice to use a set of broker nodes configured to act as a single publish subscribe broker mechanism. Herein the term 'broker' is used to cover either a single broker or a set of broker nodes acting as a single broker.

Additionally, it is common in publish/subscribe systems (whether brokered or not) for a subscriber to subscribe on its own behalf, so that the subscriber is also the recipient (sink) for appropriate matching messages. However, it is also known for a subscriber to subscribe on behalf of a separate sink; the subscriber issuing the subscriptions but the sink receiving resulting matching messages. The following embodiments are described assuming the common form, but it will be appreciated that the subscriber and sink may be separate.

Figure 1:
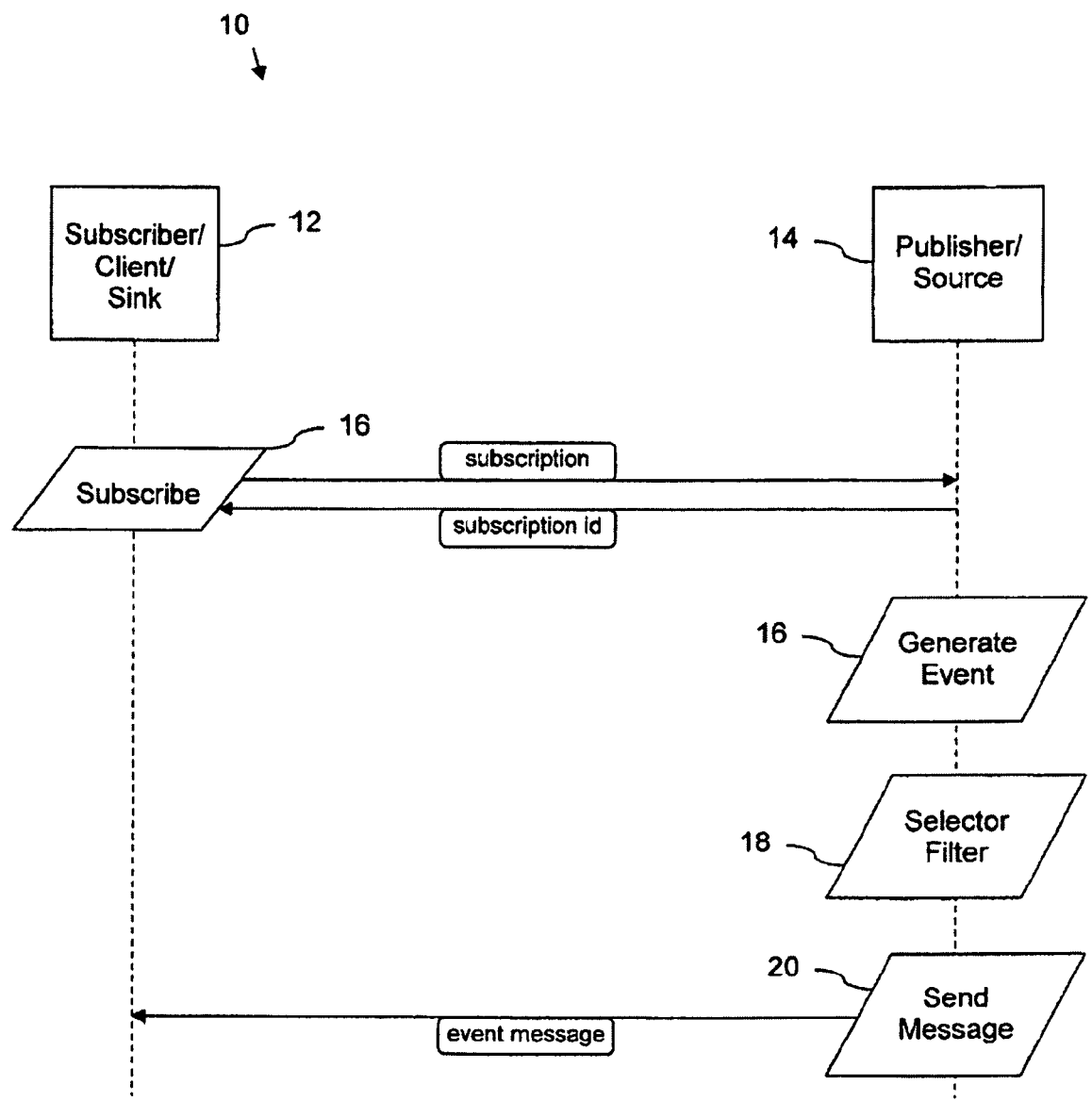
FIG. 1 shows a schematic illustration of a prior art 'direct' messaging system.

FIG. 1 illustrates a prior art 'direct' messaging system (10), as discussed above, including a subscriber/client/sink (12) and a publisher/source (14). In the messaging system 10, the subscriber/client/sink (12) initially performs a subscribe action (16) in which it sends a subscription request to the publisher/source (14) and receives therefrom a subscription id. The publisher/source (14) subsequently generates an event (16), performs selector filtering matching (18), and sends (20) an event message directly to any matching subscriber/client/sink (12).

As mentioned above, the 'direct' messaging system 10 allows the sink to control exactly which source(s) it gets messages from; however, it can result in a lot of logical connections (if there are m sources and n sinks, we have a total of n*m connections), and it requires each source to maintain a list of subscriptions and each source to distribute messages to multiple recipients.

In FIG. 1 and all subsequent figures, we have assumed the common case where the subscriber and sink are identical. It will be understood that all the patterns, both of the prior art and of the present invention, can be modified for the case where the subscriber and sink are different. It will further be understood that such modification does not materially affect the present invention.

Figure 2:
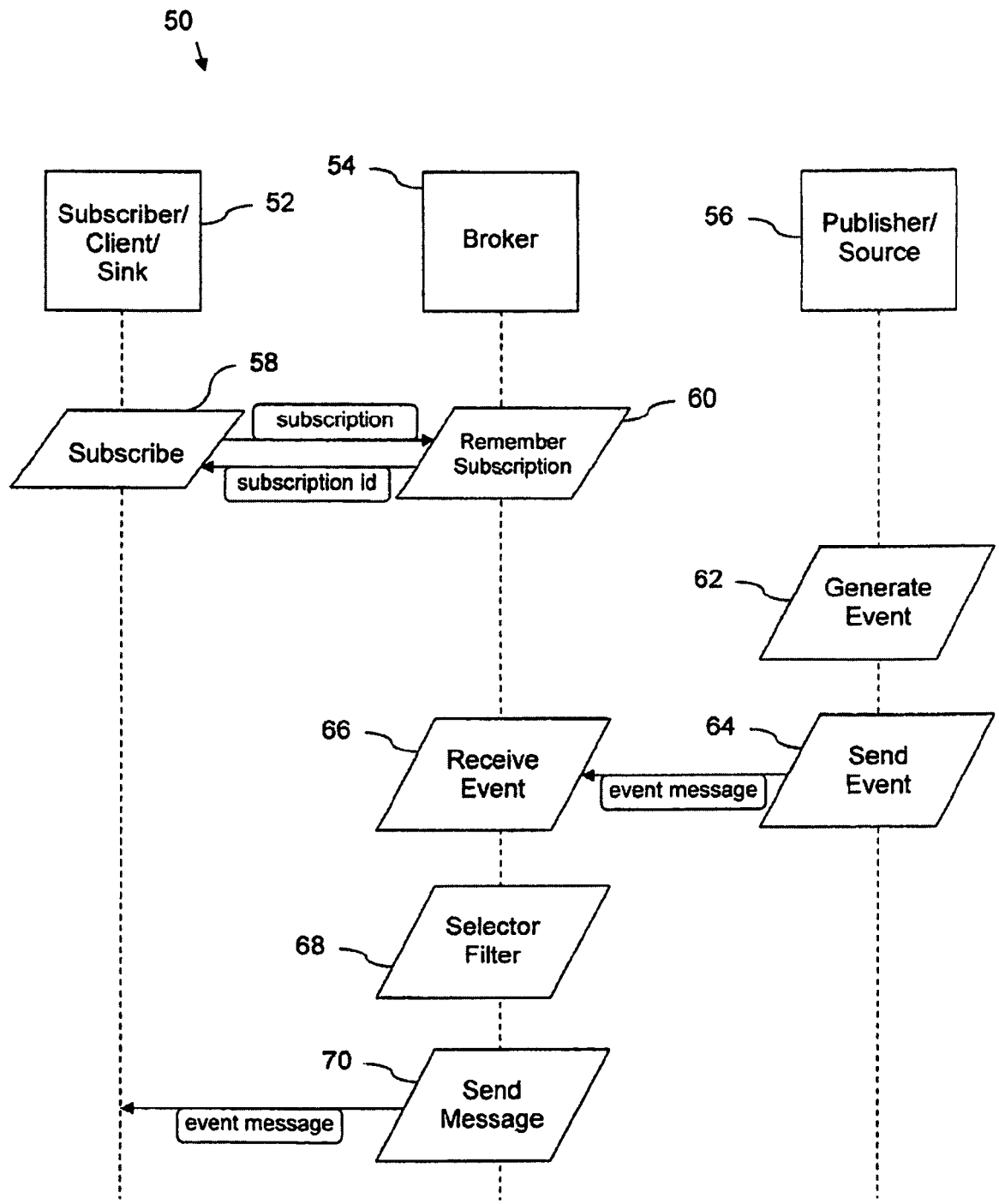
FIG. 2 shows a schematic illustration of a prior art 'brokered' messaging system.

FIG. 2 illustrates a prior art 'brokered' messaging system (50), as discussed above, including a subscriber/client/sink (52), a broker (54), and a publisher/source (56). In the messaging system (50), the subscriber/client/sink (52) initially performs a subscribe action (58) in which it sends a subscription request to the broker (54) and receives therefrom a subscription id; the broker (54) remembers the subscription (60). The publisher/source (56) subsequently generates an event (62), and sends (64) an event message to the broker (54). The broker 54 receives (66) the event, performs (68) selector filtering, and sends (70) the event message to any matching subscriber/client/sink such as 52.

As mentioned above, in the brokered messaging system 50, the subscriber does not have to be aware of the identity or location of the true source (publisher), since it never interacts with it directly. The brokered case also has the characteristic that a sink registered against the broker will receive messages from any source (publisher) that is sending relevant (e.g., matching) messages to the broker. In some situations, this may be exactly what is wanted. However in some applications (e.g., systems management) the sink might only be interested in messages from a particular set of sources.

Figure 3:
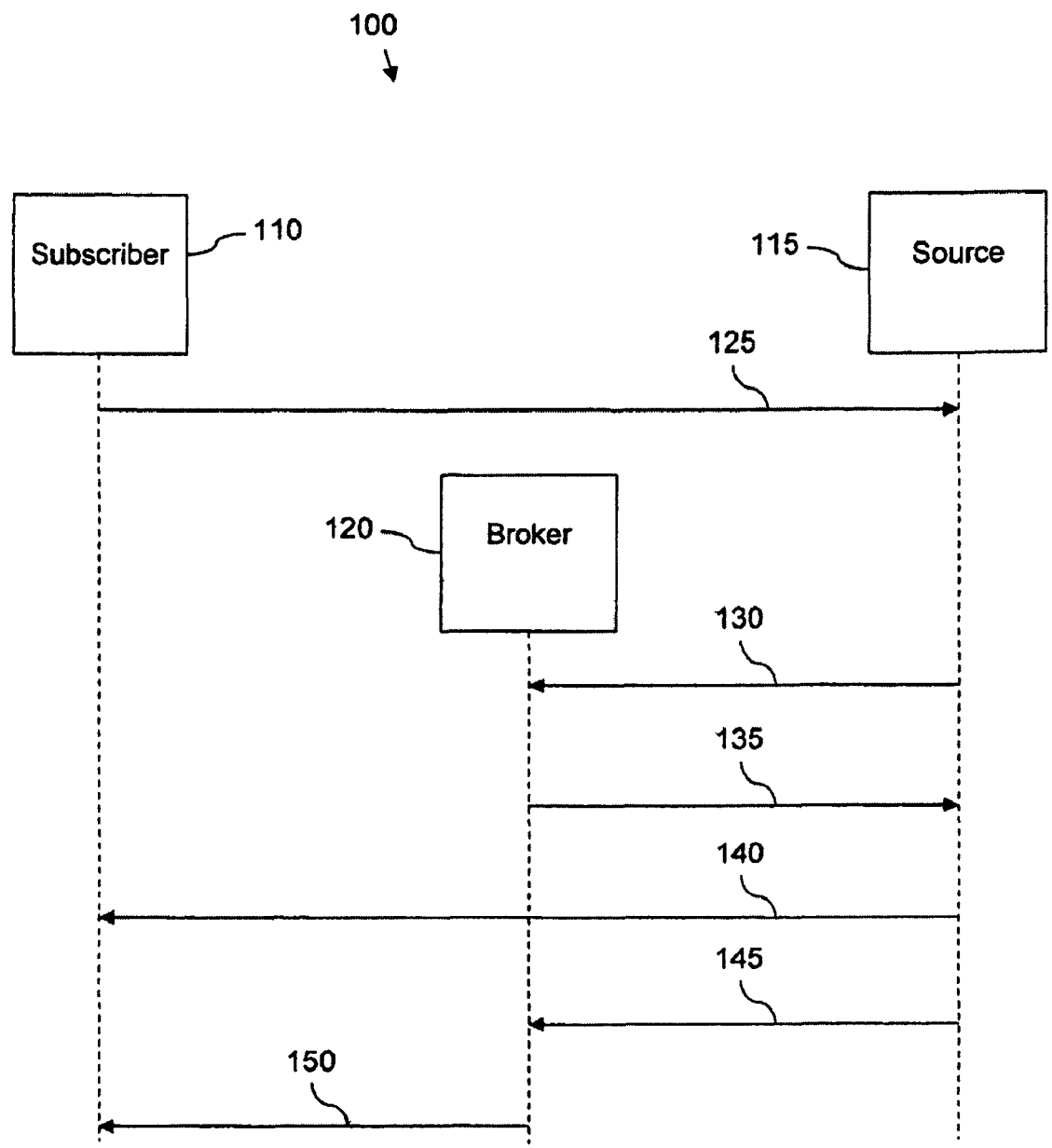
FIG. 3 shows a schematic illustration of a simple embodiment of a messaging system employing the present invention.

FIG. 3 illustrates a simple system 100, for messaging between a subscriber (110), a source (115) and a broker (120), in which disadvantages of the prior art systems 10 and 50 can be reduced. The system 100 operates under the following scheme:

i. The subscriber (110) issues a subscribe (125) against the real source (115). This includes a reference to the broker (120).

ii. The real source (115) re-issues the subscribe (130) against the broker (120), using the original sink object (110) reference.

iii. The broker (120) returns a subscription ID (135) to the real source (115), and the real source (115) takes the subscription ID returned by the broker and passes this back (140) to the subscriber (110).

iv. When the real source (115) detects an event, it sends an event message (145) to the broker (120). The broker (120) then applies its selector filters in the usual way and distributes the message (150) to the relevant sink(s) such as the subscriber (110).

The system of FIG. 3 can be used in one of two modes. In a first mode, there is a single broker for all publishers. Setting up subscriptions requires n*m connections; however, only m+n connections are needed for the flow of events. Also, the subscriber does not need to be aware of the existence of the broker. However, with this mode, the sinks receive events from all publishers.

A second mode requires each source to have a separate instance of the broker service, used exclusively by that source. This offloads work from the source and also hides the existence of the brokers from the subscriber/sink. However, it still results in n*m connections.

As discussed above, in the scheme of FIG. 3, a sink registered against the broker will receive messages from any source (publisher) that is sending relevant messages to the broker. In some situations, this may be exactly what is wanted. However, in some applications (e.g., systems management) the sink might only be interested in messages from a particular set of sources. For example, the sink might be a monitoring application that only wants to monitor 3 out of a set of 60 similar resources. This can be resolved by having a separate broker service for each publisher.

Although, as also discussed above, if the sink is registered directly with the source, it can control exactly which source(s) it receives messages from, it can result in a lot of logical connections (if there are m sources and n sinks, this results in a total of n*m connections), it requires each source to maintain a list of subscriptions, and it requires each source to distribute messages to multiple recipients.

As discussed above, the two modes of operation of FIG. 3 both achieve some benefits over prior art, but neither gives all the combined effects of m+n connections at event time and of sinks receiving messages from only selected publishers.

Figure 4:
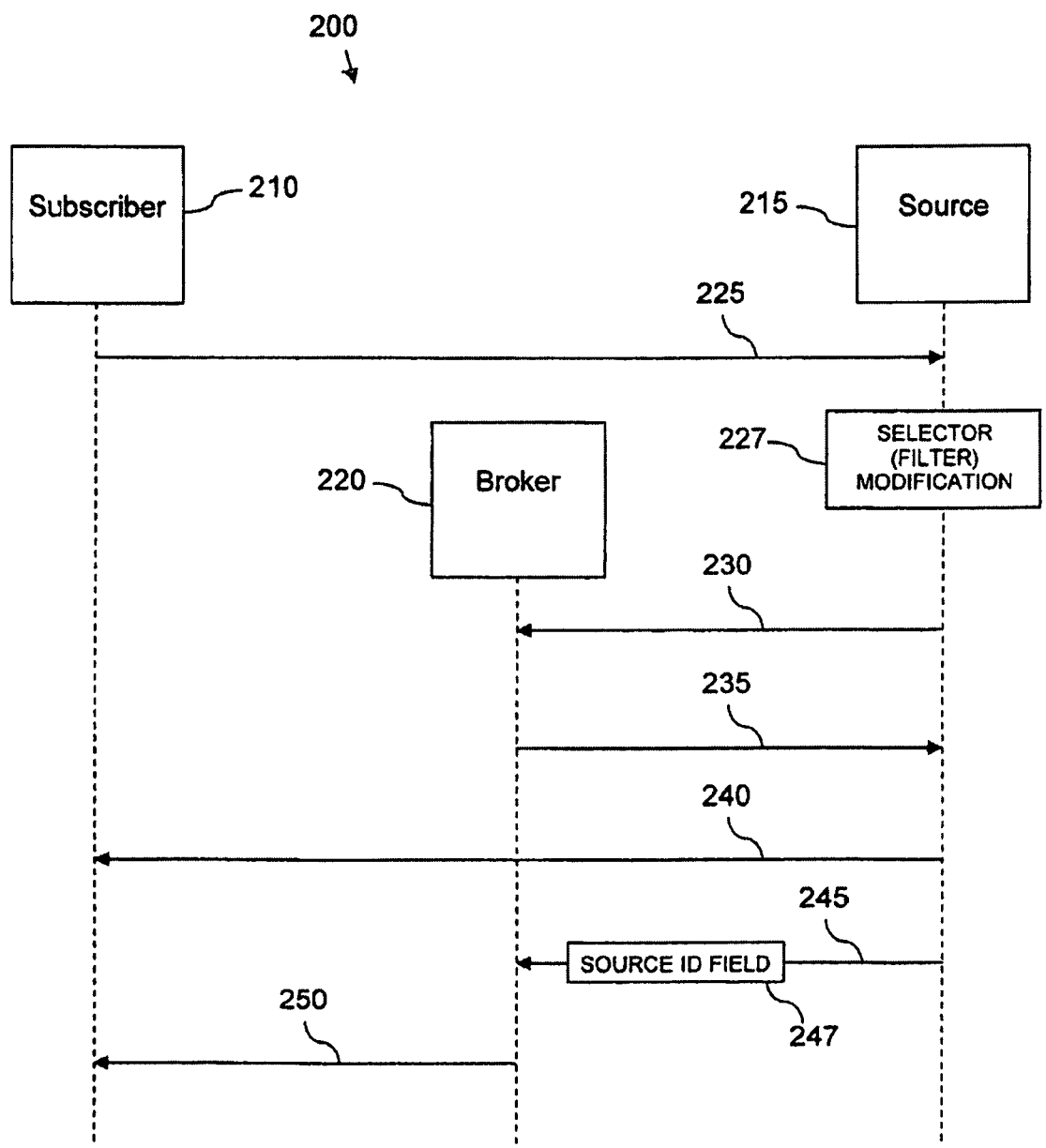
FIG. 4 shows a schematic illustration of a first preferred embodiment of a messaging system incorporating the present invention.

Referring now to FIG. 4, a system 200, in accordance with a first preferred embodiment of this invention, allows messaging between a subscriber (210), a source (215) and a broker (220) and implements the following operating scheme:

i. The subscriber (210) issues a subscribe (225) against the real source (215). This includes a reference to the broker (220).

ii. The real source (215) re-issues the subscribe (230) against the broker (220), using the original sink object (210) reference. However, in distinction to the earlier scheme of FIG. 3, the real source (215) identifies itself to the broker as part of the subscription. This identification may be [a] by modification of the selector (filter) supplied by the original subscriber (as shown schematically at 227) so that it additionally filters out any messages not originating from the real source, or [b] by explicit inclusion of an identifier of the real source in the subscription request, ("subscriptionTargetID"), or [c] by implicit inclusion of such an identifier, for example where the TCP protocol is used the broker may identify the forwarding real source from the TCP protocol wrappers of the TCP conversation.

iii. The broker (220) returns a subscription ID (235) to the real source (215), and the real source (215) takes the subscription ID returned by the broker and passes this back (240) to the subscriber.

iv. When the real source (215) detects an event, it sends an event message (245) to the broker (220). It includes in the message (245) a "message source ID" field (247), which uniquely identifies the source (215) with respect to this particular broker. When the broker (220) receives this message, it applies its selector filters in the usual way and distributes the message (250) to the relevant sink(s) such as the subscriber (210). Where the filter has not been explicitly modified as in ii[a] above, the application of the filter will include the additional step of comparing the "message source ID" with the "subscription target ID", and only forwarding messages to subscribers where these match.

The "message source ID" may be included explicitly in the message, or the inclusion may be implicit in the protocol in a similar manner to ii[c] above.

It will be understood that in the scheme of FIG. 4 the selectors are modified (step ii.) so that they are additionally filtering using the source's unique ID. In this way, the event message is only delivered to sinks that thought they were registering with the particular source in question.

Thus, it will be understood that compared to the FIG. 3's second mode requirement for n*m connections discussed above, the number of connections required for the sending of events in the system of FIG. 4 is reduced to n+m. However, up to n*m connections are still required for establishing subscriptions. At the same time, this scheme 4 eliminates the problem of FIG. 3's first mode that sinks cannot discriminate messages based on selected publishers.

Figure 5:
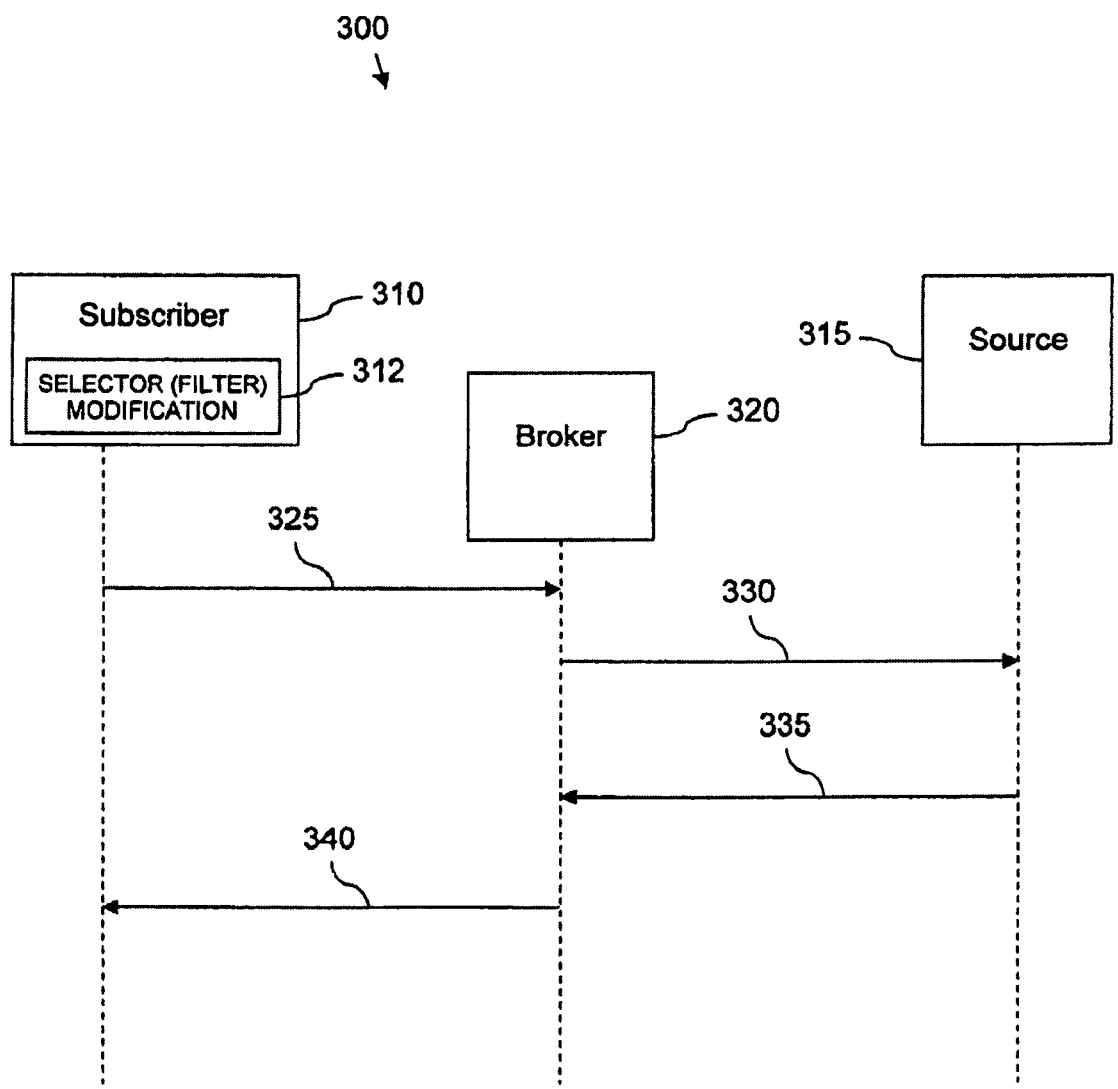
FIG. 5 shows a schematic illustration of a second preferred embodiment of a messaging system incorporating the present invention.

Referring now to FIG. 5, a system 300, in accordance with a second preferred embodiment of this invention, allows messaging between a subscriber (310), a source (315) and a broker (320) and implements the following operating scheme:

i. An application program at the subscriber (310) is unaware of the broker (320), and makes a subscription apparently directly to the real source (315). This subscription is intercepted by infrastructure (312) at the subscriber, which is aware of the broker. This subscriber infrastructure optionally adds to the subscription filter a clause that filters only on messages from the real source, and sends the filtered subscription (325) to the broker (320). The broker (320) then issues a subscribe (330) against the real source (315).

ii. When the real source (315) detects an event, it sends an event message (335) to the broker (320). When the broker (320) receives this message, it applies its selector filters in the usual way and distributes the message (340) to the relevant sink(s) such as the subscriber (310). The filtering at the broker may or may not be configured to include matching the message source with the subscription target: with this matching the system will behave as in the second mode of FIG. 3, or FIG. 4. Without this matching, it will behave as the second mode of FIG. 3.

It will be appreciated that the system 300 of FIG. 5 is very similar to that of the system 200 of FIG. 4, and it is often preferable thereto because:

1. It is simpler.
2. It will work where the publisher is not aware of the broker. This is a common situation, where the subscriber is a (well informed) administration monitor, and the publisher is an (ill informed) 'standard' resource (application program, middleware, etc).
3. For n publishers and m subscribers, it only requires a maximum of n+m connections for establishing publications. (the system 200 of FIG. 4 requires up to n*m connections for establishing publications—both require n+m connections for the message traffic itself).
4. Where the subscriber is the same as the sink (a very common case), the same connection can be used for making the subscription and for receiving messages.

It will be understood that the scheme of FIG. 5 will not work where the subscriber infrastructure is unaware of the broker, in which case (and where the publishers are aware of the broker) the scheme of FIG. 4 remains the best solution.

What is claimed is:

1. A computer implemented method for message subscription management, comprising:
    sending a subscription request from a subscriber to a first publisher;
    intercepting the subscription request from the subscriber and redirecting the subscription request to a broker;
    upon intercepting the subscription request, adding additional information to the subscription request and forwarding the additional information along with the subscription request to the broker, wherein the additional information is attached to the subscription request, wherein the additional information is provided by the subscriber, wherein the additional information includes an instruction to send event messages, which originate with the first publisher, to the subscriber, and wherein the additional information includes instructions to the broker to filter out and block content from any blocked publisher that has been identified by the subscriber;
    forwarding the subscription request from the broker to the first publisher;
    sending a first event message from the first publisher to the broker, wherein the first event message includes a message source identifier that uniquely associates the first publisher with the broker, and wherein the first publisher addresses the first event message to the subscriber; and
    forwarding the first event message from the broker to the subscriber.

2. The computer implemented method of claim 1, wherein the intercepting is directed by the subscriber that is aware of the broker, and wherein the first publisher is unaware of the broker.

3. The computer implemented method of claim 2, further comprising:
    sending a subscription ID from the broker to the first publisher; and
    returning the subscription ID to the subscriber via the broker.

4. The computer implemented method of claim 3, wherein the first event message is automatically redirected to the broker.

5. The computer implemented method of claim 4, further comprising:
    sending a second event message from a second publisher to the broker, wherein the second event message uniquely associates the second publisher to the broker and to the subscriber.

6. The computer implemented method of claim 5, further comprising:
    filtering the second event message, wherein the first event message is sent to the subscriber, but the second event message is not sent to the subscriber.

7. A system comprising:
    means for sending a subscription request from a subscriber to a first publisher;
    means for intercepting the subscription request from the subscriber and redirecting the subscription request to a broker;
    means for, upon intercepting the subscription request, adding additional information to the subscription request and forwarding the additional information along with the subscription request to the broker, wherein the additional information is attached to the subscription request, wherein the additional information is provided by the subscriber, wherein the additional information includes an instruction to send event messages, which originate with the first publisher, to the subscriber, and wherein the additional information includes instructions to the broker to filter out and block content from any blocked publisher that has been identified by the subscriber;
    means for forwarding the subscription request from the broker to the first publisher;
    means for sending a first event message from the first publisher to the broker, wherein the first event message includes a message source identifier that uniquely associates the first publisher with the broker, and wherein the first publisher addresses the first event message to the subscriber; and
    means for forwarding the first event message from the broker to the subscriber.

8. The system of claim 7, wherein the intercepting is directed by the subscriber that is aware of the broker, and wherein the first publisher is unaware of the broker.

9. The system of claim 8, further comprising:
    means for sending a subscription ID from the broker to the first publisher; and
    means for returning the subscription ID to the subscriber via the broker.

10. The system of claim 9, wherein the first event message is automatically redirected to the broker.

11. The system of claim 10, further comprising:
    means for sending a second event message from a second publisher to the broker, wherein the second event message uniquely associates the second publisher to the broker and to the subscriber.

12. The system of claim 11, further comprising:
    means for filtering the second event message, wherein the first event message is sent to the subscriber, but the second event message is not sent to the subscriber.

* * * * *